United States Patent [19]

Miyazaki et al.

[11] 3,952,492

[45] Apr. 27, 1976

[54] METHOD AND APPARATUS FOR CONTINUOUSLY CONNECTING A DISPLACEABLE PNEUMATIC CONDUIT WITH A MAIN PNEUMATIC DUCT IN A TEXTILE MACHINE

[75] Inventors: Tsutomu Miyazaki; Takashi Kato, both of Kariya; Toshio Yoshizawa, Chiryu; Yasuo Yamada, Kariya, all of Japan

[73] Assignees: Daiwa Boseki Kabushiki Kaisha, Osaka; Kabushiki Kaisha Toyoda Jidoshokki Seisakusho, both of Japan

[22] Filed: June 27, 1974

[21] Appl. No.: 483,560

[30] Foreign Application Priority Data

June 28, 1973 Japan.............................. 48-73410
July 24, 1973 Japan.............................. 48-83469
Nov. 22, 1973 Japan............................. 48-131552
Dec. 4, 1973 Japan............................. 48-135962

[52] U.S. Cl.................................. 57/34.5; 57/56
[51] Int. Cl.². ..................................... D01H 11/00
[58] Field of Search ................. 57/1 R, 34 R, 34.5, 57/56

[56] References Cited

UNITED STATES PATENTS

| | | | |
|---|---|---|---|
| 2,840,862 | 7/1958 | Hewitt | 57/34.5 X |
| 2,843,995 | 7/1958 | Furstenberg | 57/34.5 |
| 2,976,668 | 3/1961 | Reiterer | 57/34.5 X |
| 2,977,181 | 3/1961 | Reiterer | 57/34.5 X |
| 3,018,503 | 1/1962 | Hijiya et al. | 57/56 X |
| 3,073,105 | 1/1963 | Jacobi et al. | 57/34.5 |
| 3,360,914 | 1/1968 | Black et al. | 57/56 |
| 3,595,005 | 7/1971 | Saunders | 57/56 X |
| 3,665,694 | 5/1972 | Ford et al. | 57/56 X |

*Primary Examiner*—Donald E. Watkins
*Attorney, Agent, or Firm*—Burgess Ryan and Wayne

[57] ABSTRACT

In a textile machine provided with displaceable means for carrying out an operation utilizing air pressure, a main duct is disposed along the length of the machine, and the main duct is provided with a longitudinal aperture covered with a flexible covering member which permits formation of a space by deforming the skirt portion of the covering member. A connecting pipe of the displaceable means is inserted into the main duct through the space and the connecting portion is sealed by a sealing member secured to the pipe during the displacement of the displaceable means.

13 Claims, 19 Drawing Figures

METHOD AND APPARATUS FOR CONTINUOUSLY CONNECTING A DISPLACEABLE PNEUMATIC CONDUIT WITH A MAIN PNEUMATIC DUCT IN A TEXTILE MACHINE

SUMMARY OF THE INVENTION

The present invention relates to a method and apparatus for continuously connecting a displaceable pneumatic conduit with a main pneumatic duct mounted on a textile machine such as a spinning machine.

It is well known that pneumatic means such as a suction pipe or blower is often utilized as a device for cleaning textile machines, or during the yarn piecing operations or doffing and donning operations. For instance, in the well known overhead travelling cleaner such as the Parks-Cramer Frame Cleaner manufactured by the PARKS-CRAMER COMPANY in the United States of America, a pair of blowing or suction nozzles or apertures connected to a blower by way of respective flexible conduits travel along the machine frame. In certain winding machines, such as the winder manufactured by SCHLAFHORST & CO., a main duct is mounted lengthwise on the winder in such a way that an end of the main duct is connected to a blower. The main duct is provided with a plurality of connecting apertures formed at positions facing each winding unit, and each aperture is provided with a valve which connects or closes the connection between the aperture and a suction nozzle for holding a yarn end during the yarn piecing operation. However, in the overhead cleaning apparatus, since the cleaning device is designed to travel constantly around the machine frame, the mechanism becomes complex. On the other hand, in the case of the above-mentioned winder, it is impossible to carry out continuous operation.

The principle object of the present invention is to provide a method and apparatus for continuously connecting a displaceable pneumatic conduit with a main pneumatic duct which is mounted on a textile machine, wherein operation of the pneumatic conduit may be carried out continuously so that the above-mentioned problems of the conventional machine can be eliminated. To attain the above-mentioned object of the present invention, the main pneumatic duct is provided with a slit formed along the length thereof, the slit being covered with a deformable cover. A displaceable pneumatic conduit is inserted into the slit so that the connection of the pneumatic conduit is always maintained with the main duct even if the pneumatic conduit is displaced. Consequently, the construction of the cleaning device, doffing and donning apparatus or yarn piecing apparatus utilizing a pneumatic conduit means becomes very simple, with optimum functioning.

DETAILED DESCRIPTION OF THE INVENTION

Before describing the embodiment which represents the most practical application of the present invention, the basic method and application of the present invention will firstly be explained.

Figure 1:
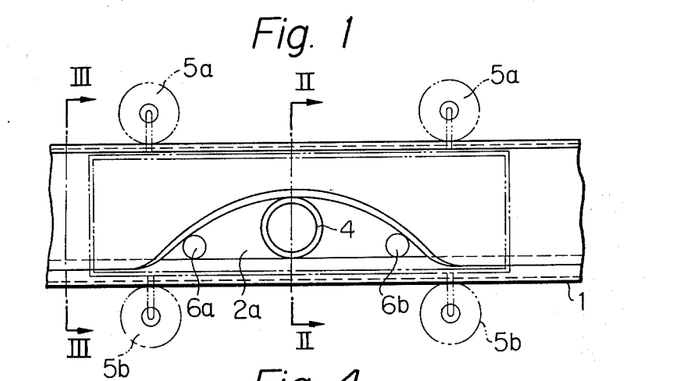
FIG. 1 is a schematic side view of the apparatus for connecting a displaceable pipe with a pneumatic duct according to the present invention.
Figure 2:
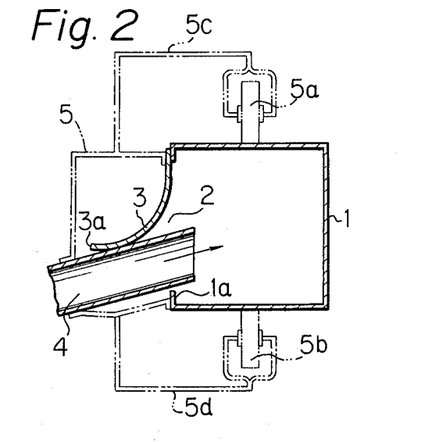
FIG. 2 is a schematic cross sectional view of the apparatus shown in FIG. 1, taken along the line II—II.
Figure 3:
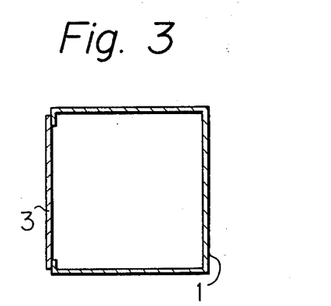
FIG. 3 is a schematic sectional view of the apparatus shown in FIG. 1, taken along the line III—III.

Referring to FIGS. 1, 2 and 3, a main pneumatic duct 1 is mounted on a textile machine such as an open-end spinning machine or winding machine, in such a manner that the main duct extends the entire length of the machine. A connecting aperture 2 is formed along the entire length of the machine. One end of the duct 1 is closed, while the other end thereof is connected to a blower which creates suction. The connecting aperture 2 is covered with a flexible cover member 3, a longitudinal edge portion thereof being secured to the upper longitudinal edge of the connecting aperture 2 while the other longitudinal edge portion of the cover member 3 is left in a free condition.

In this embodiment, the lower edge of the aperture 2 is formed by an upwardly projecting plate portion 1a as shown in FIG. 2, and the transverse width of the cover member 3 is sufficiently large to cover the projected plate portion 1a from the outside. Consequently, the lower edge portion 3a of the cover member 3 is always forced to contact the plate portion 1a by the suction air force in the main duct 1 so that the aperture 2 is always sealed by the flexible cover member 3. If the above-mentioned blower creates pressurized air in the duct 1, instead of a suction force as described above it is essential to contact the lower edge portion 3a of the cover member 3 with the projected plate portion 1a from inside the duct 1. For the sake of clarity, the above-mentioned lower edge portion 3a is hereinafter referred to as a skirt portion 3a. A displaceable connecting pipe 4 which connects an operation conduit or pipe (not shown) with the main pneumatic duct 1 is inserted into the duct 1 in such a way that an end portion thereof is inserted into the aperture 2 and is sandwiched between the skirt portion 3a of the cover member 3 and the lower edge portion 1a of the duct 1. Therefore, a temporary aperture 2a is formed between the deformed skirt portion 3a of the cover member 3 and the lower edge portion 1a of the duct 1. The temporary aperture 2a is almost fully occupied by the connecting pipe 4. To prevent free flow of air into the duct 1 through the space formed between the connecting pipe 4 and the lower edge of the deformed skirt portion 3a, a sealing cover 5 is rigidly secured to the connecting pipe 4 such that the sealing cover 5 is in slidable contact with the duct 1 as shown in FIG. 2.

In the embodiment shown in FIGS. 1 and 2, a pair of guide rollers 5a are turnably supported by a bracket 5c secured to the sealing cover 5 while a pair of guide rollers 5b are turnably supported by a bracket 5d secured to the sealing cover 5, such that these rollers 5a and 5b are capable of rolling respectively on the upper and lower outer surfaces of the duct 1.

It is preferable to position the connecting pipe 4 at the center position of the longitudinal side wall of sealing cover 5.

Figure 4:
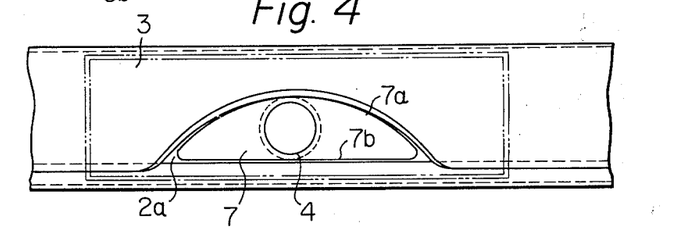
FIG. 4 is a schematic side view of a modification of the apparatus shown in FIG. 1.

In the embodiment shown in FIG. 1, a pair of rods 6a and 6b are secured to the sealing cover 5 so as to allow smooth deformation of the flexible cover member 3 permitting the connecting pipe 4 to be disposed at an intermediate position between these rods 6a and 6b. The diameters of the rods 6a and 6b are noticeably less than that of the connecting pipe 4. Instead of utilizing the rods 6a and 6b, a guide plate 7 having an arched guide surface 7a and a straight guide surface 7b, as shown in FIG. 4, can be rigidly mounted on the connecting pipe 4 at the point where the pipe 4 contacts the covering member 3 so that the arched guide surface 7a contacts the skirt 3a, while the straight guide surface contacts the lower edge 1a of the duct 1. Therefore, the guide plate 7 enhances the sealing effect of the sealing cover 5.

As mentioned above, the present invention is very useful for a yarn end holding device of a yarn piecing apparatus or an automatic doffing and donning apparatus for a spinning or winding machine, where a suction air force is utilized. Moreover, if the covering member 3 is designed to contact the lower edge 1a of the duct from inside of the duct 1, the present invention may also be utilized with good results for an automatic cleaning apparatus.

Figure 5A:
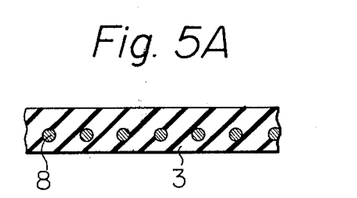
FIGS. 5A, 5B and 5C are schematic sectional views of a flexible covering member preferably utilized for the apparatus shown in FIG. 1.
Figure 5B:
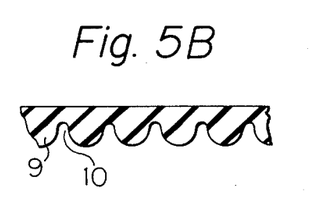
Figures 5C, 6:
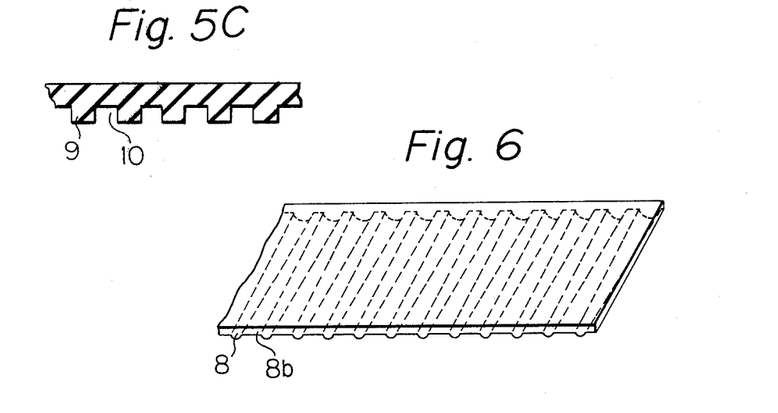
FIG. 6 is a schematic perspective view of a preferred embodiment of a flexible covering member according to the present invention.

From our experience, we have found that for the covering member 3, it is preferable to use a flexible material having heterodirectional properties so as to create sufficient sealing effect by the covering member 3. That is, in such a material, flexibility in the lengthwise direction along the duct 1 is considerably greater than that in the transverse direction of the duct 1. Some embodiments of the above-mentioned material having heterodirectional properties are shown in FIGS. 5A, 5B 5C and 6. The material shown in FIG. 5A, is provided with a plurality of core strands 8 running parallel to the transverse direction of the material, and the materials shown in FIGS. 5B and 5C are provided with a plurality of ribs 9 and grooves 10 transversely formed and parallel to each other. The material shown in FIG. 6 is provided with a plurality of ribs and grooves transversely formed such that their widths in cross section vary along the lengthwise direction of the material.

Due to the method for connecting the main pneumatic duct 1 to the displaceable connecting pipe 4 according to the present invention, the sealing effect is mainly dependent upon the flexibility and resiliency of the covering member 3. It is understood that the size of the aperture 2a created by the deformation of the covering member 3 depends upon the above-mentioned properties of the covering member 3 and the thickness of the connecting pipe 4. Therefore, if the materials shown in FIG. 5A through FIG. 6 having hetero-directional flexible and resilient properties are utilized for the covering member 3, the covering member 3 is easily deformed by the displacement of the connecting pipe along the main duct 1, thus minimizing the size of the aperture 2a and creating an excellent sealing effect.

Figure 7:
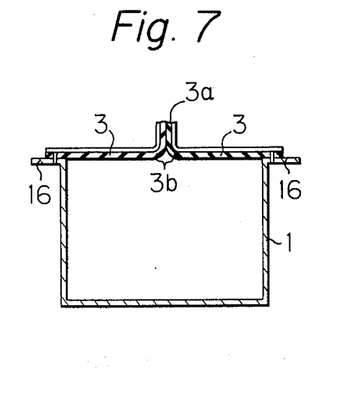
FIGS. 7, 8 and 9 are, respectively, a schematic cross sectional view of a pneumatic duct, a schematic cross sectional view of the pneumatic duct assembled with a connecting pipe, and a schematic plan view of the assembly shown in FIG. 8, all in accordance with the present invention.
Figure 8:
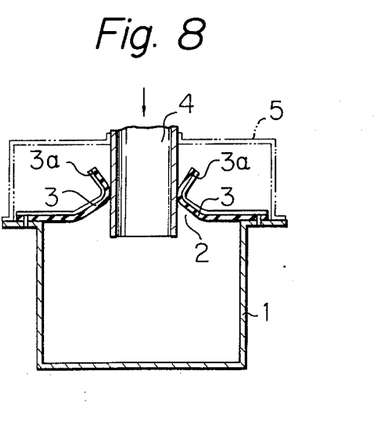
Figure 9:
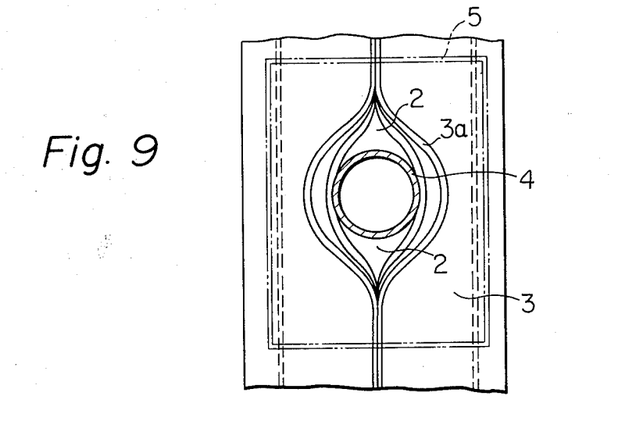
Figure 10:
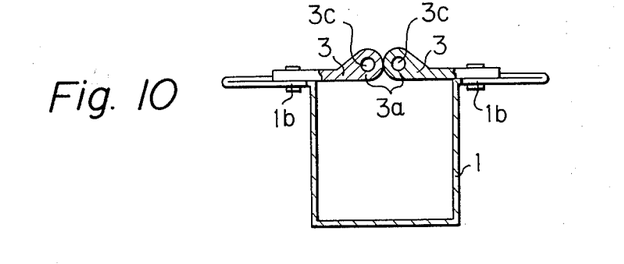
FIGS. 10 and 11 are schematic cross sectional views of the pneumatic ducts according to the present invention.
Figure 11:
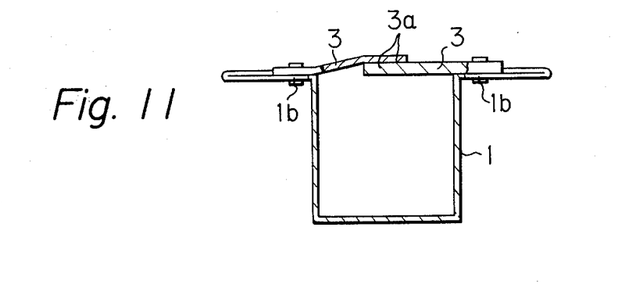

Another embodiment of the apparatus for connecting the main pneumatic duct 1 with the connecting pipe 4 is shown in FIGS. 7, 8 and 9. In this embodiment, a longitudinal aperture 2 is formed in the upper side of the duct 1 and a pair of covering members 3 are utilized such that each member 3 is rigidly held along one longitudinal edge by one longitudinal side edge 1b of the duct 1. The free longitudinal edges, that is, parts 3a of these covering member 3 contact each other, thus sealing the duct 1. The connecting pipe 4 is inserted into the duct through the covering members 3 as shown in FIG. 8. To create a perfect sealing effect, a sealing member 5 is also mounted on the connecting pipe 4, as in the previous embodiment. According to our experiments, it was confirmed that a sealing effect similar to the previous embodiment can be attained by the second embodiment shown in FIGS. 7, 8 and 9. As a modification of the covering members 3 of the second embodiment, a flexible material provided with hollow tubes 3c which passes through the material 3 along the curved edge portions 3b (FIG. 10) may be utilized. By the use of this material, the sealing effect created by the contact between the curved edge portions 3b in the second embodiment is made more effective. A further modification of the covering member 3 shown in the second embodiment (FIGS. 7, 8 and 9) is shown in FIG. 11. In this embodiment, the skirt portions 3a of the pair of covering members 3 contact each other in a superposed condition.

Next, an open-end spinning machine provided with a doffing and donning apparatus utilizing a pneumatic main duct and a pair of suction ducts, with the pipe connection of the present invention, will be described in detail.

Figure 12:
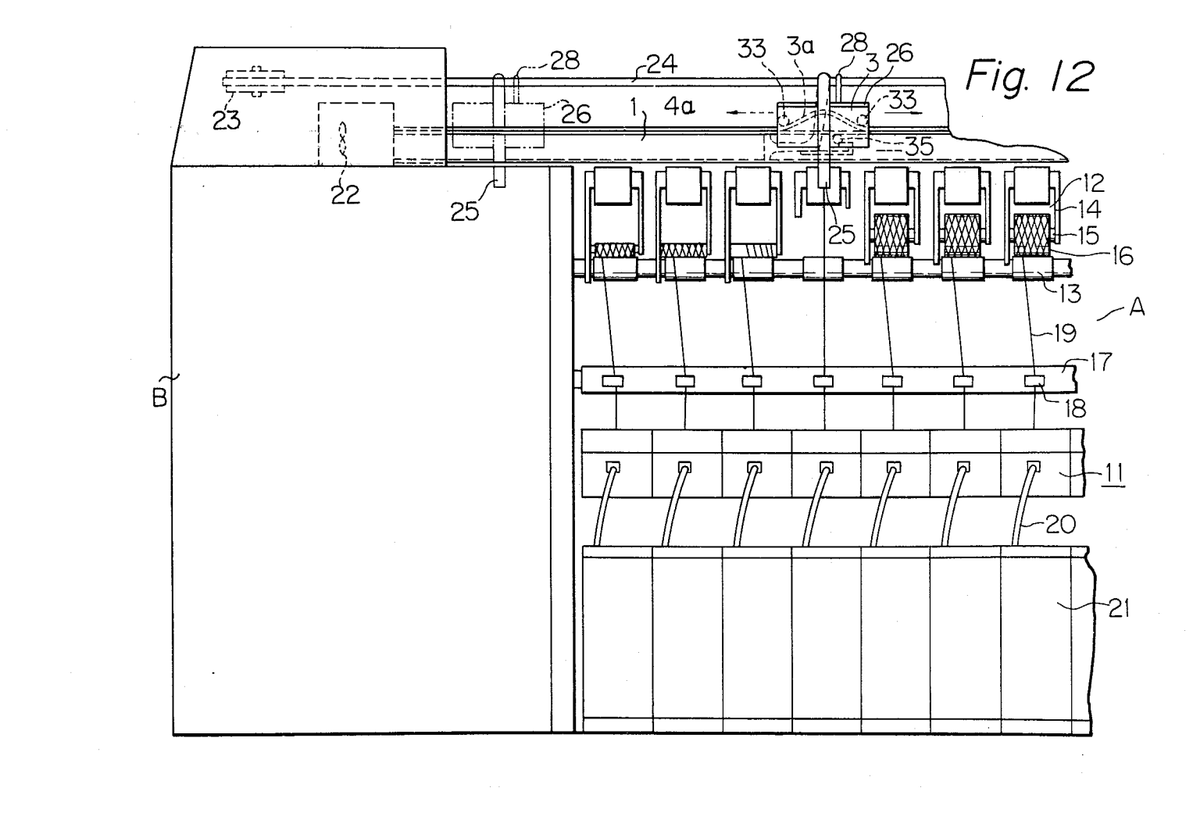
FIG. 12 is a schematic front view of a part of an open-end spinning machine utilizing a suction nozzle for holding a yarn end during a doffing and donning operation wherein the pipe connecting apparatus of the present invention is used.
Figure 13:
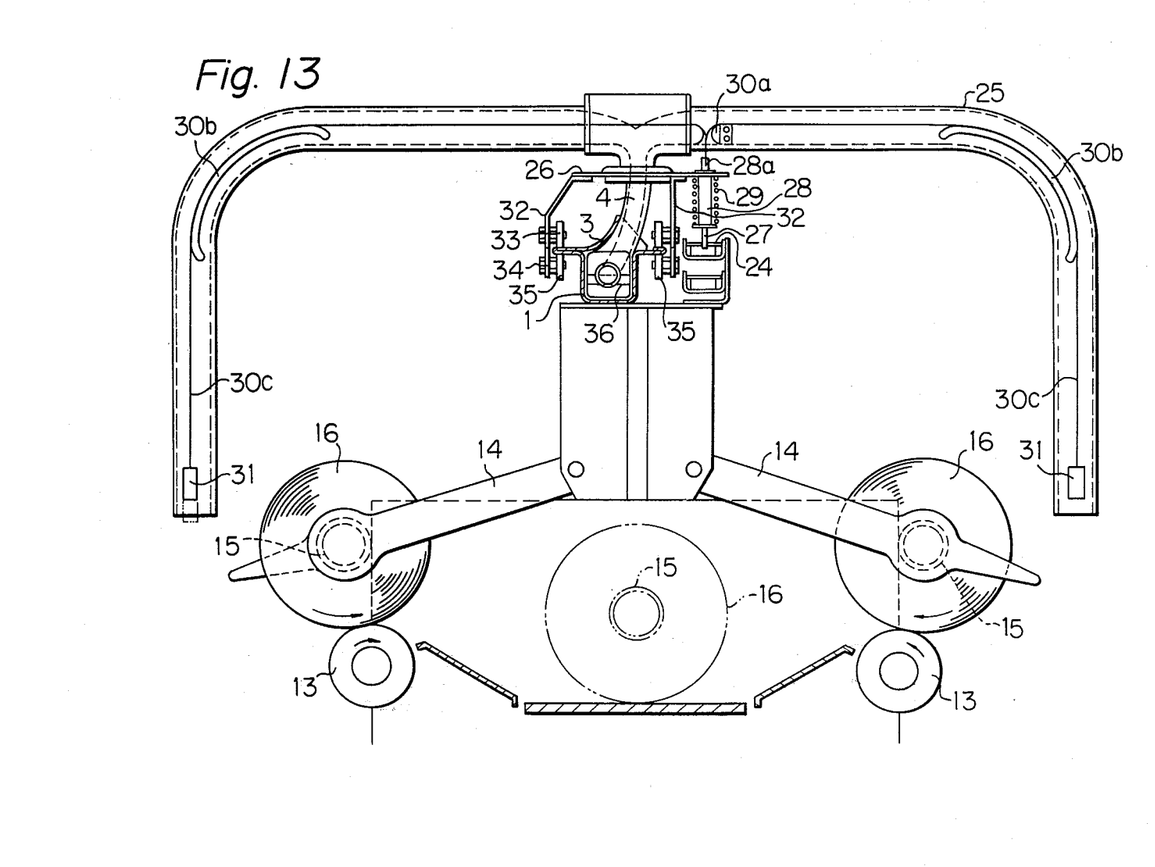
FIG. 13 is an elevational view of the suction nozzle means and a part of the spinning machine shown in FIG. 12.

Referring to FIGS. 12 and 13, in an open-end spinning frame A provided with a head stock B, each operation unit comprises a spinning unit 11, and a winding unit 12 provided with a split drum 13 and a cradle 14 which holds a bobbin 15 so that yarn package 16 can rotatably contact the split drum 13, and a pair of draw-off rollers 17 and 18 which takes off a yarn 19 from the spinning unit 11. A sliver 20 is supplied to the spinning unit 11 from a supply can 21. A pneumatic duct 1 with a construction similar to the first embodiment is mounted along length of the spinning machine at a position above the winding units, and a suction blower 22 is disposed at a position above the head stock B and is connected to the end of the duct 1.

Figure 14:
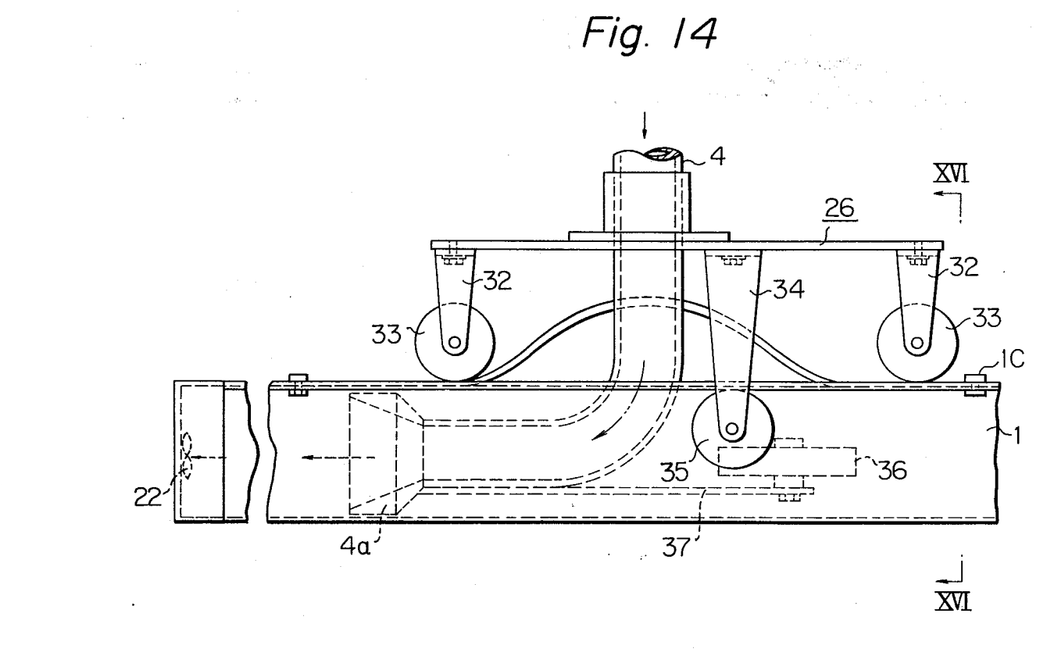
FIGS. 14 and 15 are a schematic side view and a plan view of a part of the pipe connection shown in FIG. 12.
Figure 15:
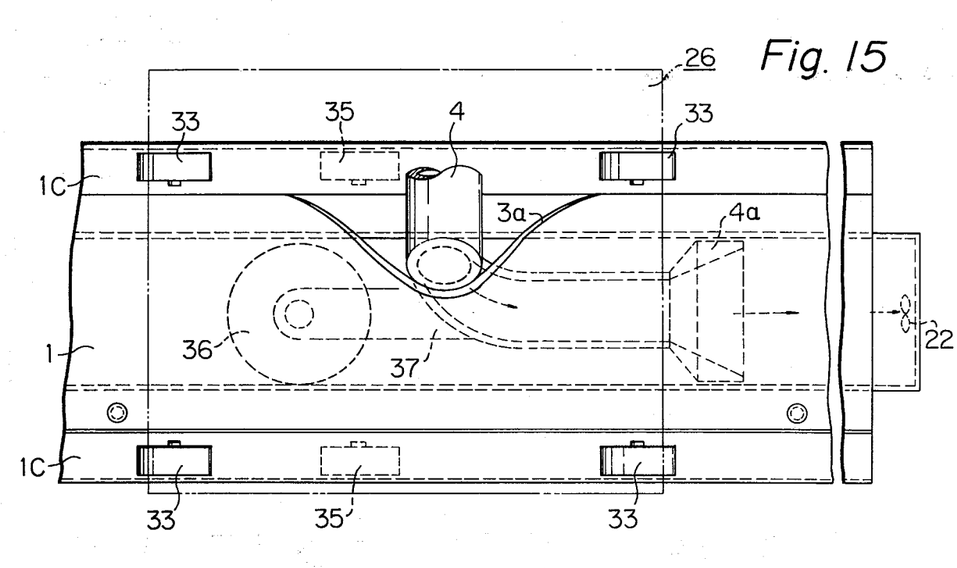
Figure 16:
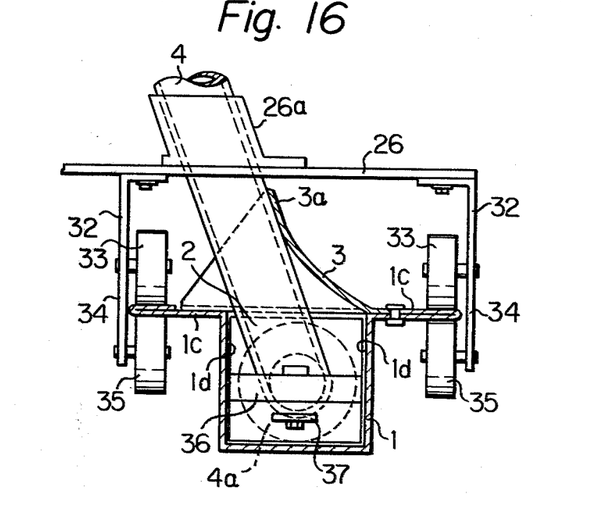
FIG. 16 is a schematic cross sectional view of the pipe connection shown in FIG. 14, taken along the line XVI—XVI.

A driving mechanism 23 comprising a motor (not shown) and a pulley (not shown) is disposed above the suction blower 22 and a horizontal endless belt 24, driven by driving mechanism 23 is disposed above the pneumatic duct 1 as shown in FIG. 12. The duct 1 is provided with a longitudinal horizontal aperture 2 (FIG. 16) formed in the top wall of the duct 1 along the length of the machine and a suction nozzle or conduit 25 for holding a yarn end in the doffing and donning operation is mounted by way of a connecting pipe 4 on a carrier member 26 which travels along the machine frame. The connecting pipe 4 connected to the suction nozzle or conduit 25 is inserted into the duct 1 through a space between the skirt portion 3a of the flexible covering member 3 and an edge of the aperture 2 of the duct 1 (FIG. 16). Therefore the connecting pipe 4 is connected to the duct 1 in a displaceable condition. In this embodiment, the connecting pipe 4 is rigidly mounted on the carrier member 26 by a bracket 26a as shown in FIG. 16. The end portion 4a of the pipe 4 is expanded so that the transverse cross section of the duct 1 is occupied by the end portion of the pipe 4. Therefore, the suction force created by the suction blower 22 is effectively transmitted to the connecting pipe 4. (FIGS. 14, 15 and 16).

Referring again to FIGS. 12 and 13, the carrier member 26 is detachably engaged with the endless belt 24 by way of an engaging member 27, so that the carrier member 26 holding the suction nozzle or conduit 25 is capable of displacement along the machine and can stop temporarily in front of any winding and spinning unit. The engaging member 27 is provided with a pin 28 for engaging the carrier member 26 with the belt 24. The belt 24 is provided with a plurality of apertures, any one of which is capable of accepting the pin 28. The pin 28 is always urged toward the belt 24 by an expansion spring 29 in order to maintain the engagement of the carrier member 26 with the belt 24; however, if it is necessary to stop the carrier member 26 at a position in front of any given winding and spinning unit, the engagement of the pin 28 with the belt 24 can be released by a manual control means comprising a guide members 30a and 30b, an operation handle 31 mounted respectively on each suction conduit 25, and an operation wire 30c which connects a top end portion of the pin 28 and the operation handle 31 by way of the guide members 30a and 30b. In other words, when the wire 30c is pulled by the operation handle 31, the pin 28 is pulled from the belt 24, releasing the engagement of the pin 28 with the aperture of the belt 24.

In this embodiment, the carrier member 26 is provided with rollers which rotate on the outside and inside walls of the duct 1, thus ensuring, by construction, the stable running of carrier member 26 along the duct 1. As shown in FIGS. 14, 15 and 16, the carrier member 26 is provided with first brackets 32, second brackets 34, and four wheels 33 which are turnably supported by the first brackets 32 such that the wheels 33 are capable of running along the top surfaces of a pair of longitudinal flanges 1c horizontally extending outside of the duct 1. A pair of wheels 35 are turnably supported by the second brackets 34 in such a way that the wheels 35 are capable of rolling along the under surface of the flanges 1c. Therefore, the flanges 1c of the duct 1 are sandwiched between the wheels 33 and 35. By the above construction, possible pitching of the carrier member 26 can be effectively prevented. To prevent rolling of the carrier member 26, an auxiliary wheel 36 is turnably mounted on a bracket 37 which is secured to a portion of the connecting pipe 4 at a position inside the duct 1. The diameter of the wheel 36 is so selected that the wheel 36 can, while turning, contact both inside side walls 1d.

As the expanded end portion 4a of the connecting pipe 4 occupies the transverse space of the duct and the auxiliary wheel 36 contacts the inside side walls 1d, the possible rolling motion during displacement of the connecting pipe 4, that is, the carrier member 26 can be effectively prevented.

Figure 17:
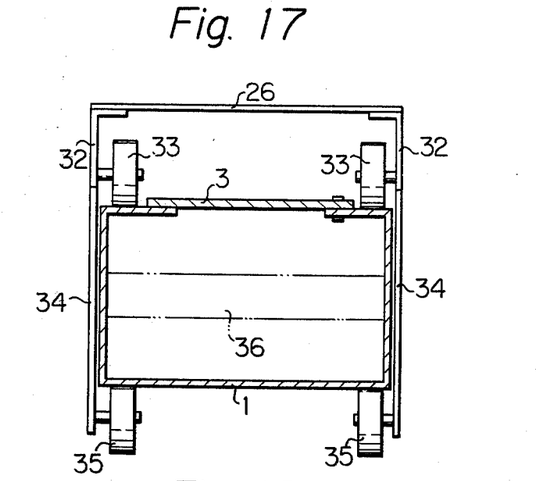
FIG. 17 is a schematic sectional view of a modification of the pipe connection shown in FIGS. 14, 15 and 16.

A modification of the carrier member 26 is shown in FIG. 17. In this modification, the wheels 33 and 35 are capable of rolling directly on the upper and lower longitudinal surfaces of the duct 1, instead of rolling on the horizontal flanges 1c projecting laterally from the duct 1. Therefore, the construction of this particular apparatus can be made more simple in comparison with the embodiment shown in FIGS. 14, 15 and 16.

What is claimed is:

1. In a textile machine provided with displaceable means for carrying out an operation utilizing suction air and a main pneumatic duct disposed along the entire length of the machine for applying suction air pressure to said displaceable means, and a suction source for creating said suction pressure, the improvement comprising means for continuously connecting said main duct with said displaceable means, said means for continuously connecting said main duct comprising a continuous aperture formed in said main duct along the longitudinal direction of said duct, means for covering said continuous aperture to form a space along said continuous aperture; said displaceable means comprising a pneumatic pipe means, a connecting pipe with an end portion thereof inserted into said duct through said space and connected to said pneumatic pipe means, means for sealing said space on either side of said connecting pipe when said connecting pipe is displaced along said aperture according to displacement of said displaceable means.

2. An apparatus for connecting a main duct with a displaceable pipe according to claim 1, wherein said covering member is a resilient flexible material provided with a plurality of parallel core strands therein dispose along a transverse direction of the material whereby said traveling member has heterodirectional flexibility.

3. An apparatus for connecting a main duct with a displaceable pipe according to claim 1, wherein said covering member is a resilient flexible material provided with a plurality of alternating ribs and grooves formed parallel to the transverse direction of the material whereby said covering member has hetero-directional flexibility.

4. An apparatus for connecting a main duct with a displaceable pipe according to claim 3, wherein said ribs and grooves of said covering member are provided with cross sections which gradually change in size along their lengths.

5. An apparatus for connecting a main duct with a displaceable pipe according to claim 2, wherein said connecting pipe is provided with an elongated portion extended longitudinally in said main duct, said sealing means comprising a transversely expanded portion formed at a terminal end portion of said elongated portion of said connecting pipe said transversely expanded portion occupying the inner transverse cross sectional area of said main duct.

6. An apparatus for connecting a main duct with a displaceable pipe according to claim 2, further comprising means for preventing rolling and pitching during displacement of said displaceable means.

7. An apparatus for connecting a main duct with a displaceable pipe according to claim 6, wherein said means for preventing rolling and pitching of said displaceable means comprises a plurality of guide wheels turnably mounted on said displaceable means such that portions of said main duct are sandwiched by said guide wheels, and a bracket secured to a portion of said connecting pipe in said main duct having an inside guide wheel turnably mounted on said bracket in said main duct to allow said inside guide wheels to roll on two inner walls of said main duct which inner walls face each other.

8. An apparatus for connecting a main duct with a displaceable pipe according to claim 6, wherein said elongated portion of said connecting pipe extends towards said suction force.

9. An apparatus for connecting a main duct with a displaceable pipe according to claim 5, wherein said elongated portion of said connecting pipe extends to a position spaced from the position at which said connecting pipe passes through said covering means.

10. An apparatus for connecting a main duct with a displaceable pipe according to claim 7, wherein said connecting pipe comprises an elongated portion extending longitudinally in said main duct, said sealing means comprising a transversely expanded portion formed at a terminal end portion of said elongated portion of said connecting pipe, said transversely expanded portion occupying the inner transverse cross sectional area of said main duct, said inside guide wheels being mounted at positions corresponding to said expanded portion of said connecting pipe.

11. In an apparatus having a suction source and means for movably interconnecting a suction pipe to said source, the improvement comprising a main duct, one end of said duct being connected to said source, said duct having a longitudinally extending slot, a flexible cover positioned over said slot and having one edge affixed to said duct, whereby suction pressure in said duct on said cover tends to seal said slot, said suction pipe extending into said duct by way of said slot adjacent another edge of said cover, whereby said suction pipe may be moved longitudinally of said duct while extending through said slot, and rigid sealing means affixed to said suction pipe and slidably engaging said duct at a position spaced from the position at which said pipe extends into said duct, for inhibiting passage of air through said slot in the region adjacent said pipe.

12. The apparatus of claim 11 wherein the end of said pipe in said duct extends longitudinally toward said source, and said sealing means comprises an enlarged end on said pipe in said duct and substantially filling the inner transverse cross sectional area of said duct.

13. The apparatus of claim 11 wherein said sealing means comprises a sealing cover affixed to said pipe externally of said duct and having edges slidably engaging said duct and cover in the region thereof surrounding the position of said slot through which said pipe extends.

* * * * *